Sept. 30, 1941.        W. A. BLACK.              2,257,561
              BLOOPING DEVICE FOR SOUND REPRODUCERS
                       Filed July 26, 1938
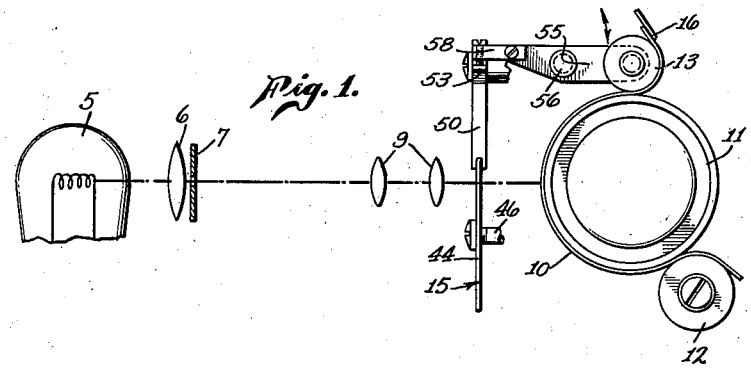
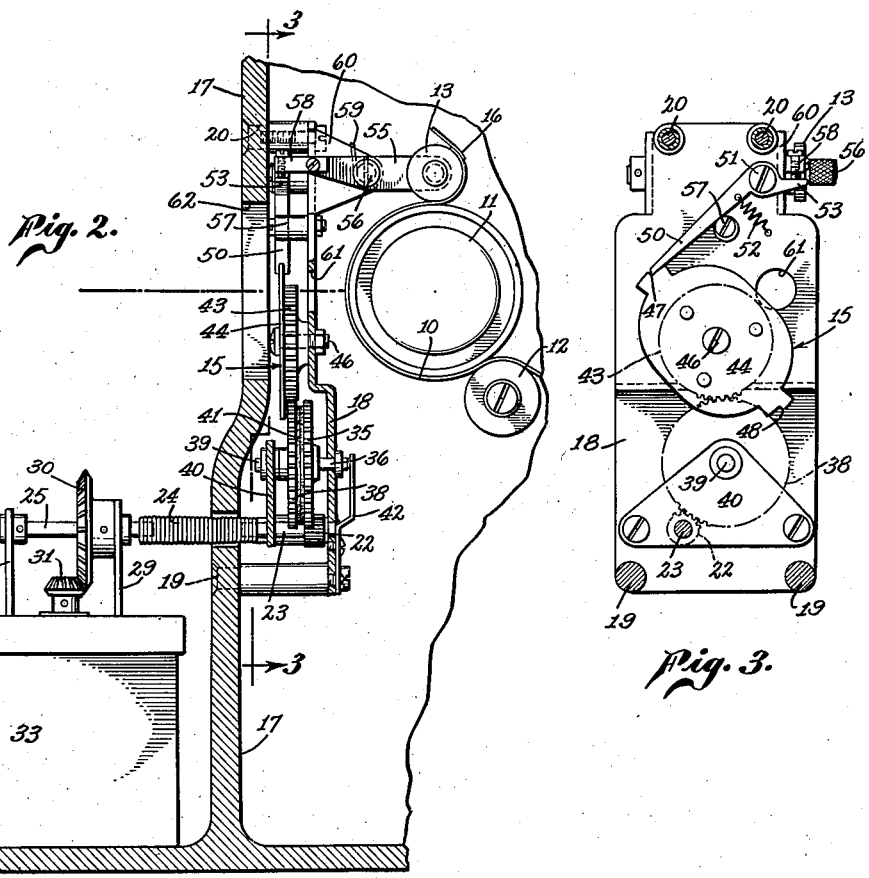
Inventor
William A. Black,
By
                Attorney Patented Sept. 30, 1941

2,257,561

UNITED STATES PATENT OFFICE 2,257,561

BLOOPING DEVICE FOR SOUND REPRODUCERS

William A. Black, Montclair, N. J., assignor to Radio Corporation of America, a corporation of Delaware Application July 26, 1938, Serial No. 221,312

20 Claims. (Cl. 179—100.3)

This invention relates to sound film apparatus and particularly to a sound reproducing system for spliced film or film having other extraneous abrupt interruptions in the sound track portion thereof.

In the production of sound motion picture films the picture and sound films are not only recorded separately, but are taken in sequences or "takes" which are cut or edited and spliced together to make a preliminary continuity for previewing and re-recording. For these purposes, the picture continuity is run through a picture projector and the sound film continuity is run through a sound head or reproducer in synchronism with the picture. This projection and reproduction are done so that the better sequences or part thereof may be further selected or edited before the final negative is made for double printing of picture and sound on a single film or for the purpose of combining dialogue and sound effects from spliced prints carrying the appropriate sound track to make the final negative.

In running the sound prints made up of the various spliced portions together, the spliced ends ordinarily pass through the sound reproducing light beam and modulate the beam abruptly to cause clicks or plops in the loudspeakers, which are particularly annoying. When the print is being rerecorded, the recording beam is correspondingly modulated to produce a similar variation on the new negative.

An object of the present invention, therefore is to eliminate modulation of a reproducing light beam by film splices or other abrupt light variations on the sound track passing through a reproducer.

Another object of the invention is to eliminate the light beam from the photoelectric cell of a rerecording system during the passage of a splice past the translation point in such a manner as to prevent the change of light on the cell from deleteriously affecting the loudspeaker and/or recorder.

Another object of the invention is to provide a continuously energized shutter adapted to be released by film splices passing through the sound reproducer.

Another object of the invention is to interrupt a light beam being impressed upon the sound track area of a motion picture film in a predetermined manner by a shutter actuated or controlled by film splices.

Devices for producing a tapered variation in the light to the sound track portion of a film are well known in the art as evidenced by Case Patent No. 1,896,682. This patent discloses notches in the film to operate a shutter between the light beam and the film, or to control the light source to vary the light beam reaching the film. The result is a tapered variation in the light reaching the photoelectric cell. The spliced portion of the sound track may also be treated to provide a tapered patch of varying opacity. This also produces a variation in the reproducing light beam reaching the photoelectric cell. The present invention produces a similar variation in the reproducing light beam during reproduction of a spliced sound track which does not have such patches. Another form of apparatus for eliminating light from the photocell during reproduction is disclosed in U. S. Patent No. 1,810,527. The present invention, however, is an improvement in the mechanism of these disclosures, since it is energized from an auxiliary source and its action is controlled by the variations in film thickness caused by the splice itself.

Although the novel features which are believed to be characteristic of this invention are pointed out with particularity in the claims appended herewith, the manner of its organization and the mode of its operation will be better understood by referring to the following description read in conjunction with the accompanying drawing forming a part thereof, in which—

Figure 1 is a diagrammatic view of a sound reproducing optical system having the position of the shutter in the system;

Figure 2 is a cross-sectional view of the shutter operating and tripping mechanism; and Figure 3 is an elevational view of the mechanism of Fig. 2 taken along line 3—3.

Referring now to Fig. 1, 5 represents a light source, the light from which is collected by a lens 6 and defined by a slit mask 7, the image of the slit being projected by objective lenses 9 to the sound track portion of a film 10 passing over a roller 11. A wrapping or guide roller 12 is shown below the roller 11 and a shutter control or tripping roller 13 is shown above the roller 11. The roller 13 controls the operation of a shutter 15 which normally does not interfere with the passage of light from the lamp 5 to the film 10. However, when the shutter is tripped by the roller 15 passing over a splice 16, the shutter rotates 180° and eliminates the light from the film in a manner now to be described.

In Figs. 2 and 3, a vertical partition or wall 17 of the main casting has attached thereto at points 19 and 20 a mounting plate 18. Between the plates 17 and 18 are positioned a plurality of intermeshed gears and a shutter, a driving gear 22 being mounted on a shaft 23. The shaft 23 is connected through a spiral spring 24 to a shaft 25 mounted on supports 28 and 29. Keyed to shaft 25 is a bevel gear 30 in mesh with a bevel gear 31, the bevel gear 31 being connected to a prime mover such as a motor in the casing 33. This motor may be either the driving motor for the film advancing mechanism or an independent motor.

Referring now to the other gears, the driving gear 22 on shaft 23 drives a larger gear 35 mounted on a stub shaft 36. Coaxially mounted with the gear 35 is a similar gear 38 mounted on a stub shaft 39 supported by standard 40. Attached to opposing faces of gears 35 and 38 are contacting friction pads or discs 41, the pads being maintained by a spring 42 bearing against the end of the shaft 36 in sufficient contact to rotate gear 38 when the mechanism is tripped by roller 13.

Meshing with the gear 38 is a gear 43 to which is attached a shutter 44, the configuration of the shutter being shown in Fig. 3. The shutter 44 and gear 43 are mounted for rotation on a shaft 46, the shutter having notches 47 and 48 therein diametrically opposite to one another. Positioned in notch 47 of the shutter is shown a trip lever 50 pivoted at 51 and under tension of a spring 52. The other end of the lever 50 is in the form of an ear 53 adapted to contact end 58 of a lever 55 pivoted at 56, the lever 55 having the roller 13 at the other end thereof. The roller 13 is forced toward the drum 11 under tension of a spring 59 coiled around the pivot 56 and locked against a supporting bracket 60.

Now as the splice 16 passes between the rollers 11 and 13, roller 13 is raised, which lowers end 58 of lever 55. Lever end 58 thus contacts ear 53 of the lever 50 and lifts the other end of lever 50 out of the notch 47. The shutter 44 is then released for rotation and, when it rotates, the lever 50 is slightly pulled downwardly until it contacts a stop 57. The lever 50 will so remain until it contacts notch 48 when this notch of the shutter reaches the position of notch 47 shown in Fig. 3. As stated above, the gear 35 is continuously rotated in frictional contact with gear 38 through the intermediate contact pads or discs 41. Now when lever 50 is tripped to release the shutter, the shutter is rotated by the prime mover through the chain of gears above mentioned. The shutter 44 makes only half a revolution for each trip and is then stopped by lever 50.

The rotation of the shutter 44 eliminates the projection of the light from the lamp 5 to the film 10. Ordinarily the light beam is projected through a hole 61 in the plate 18 and through an opening 62 in the wall 17. Thus, it will be observed from Fig. 3 that due to the elliptical form of the shutter 44 that the hole 61 will be covered by the shutter 44 when the shutter has made ¼ revolution, and will be uncovered to the extent shown when it completes the next ¼ revolution. Also, due to the curvature of the shutter, the light will be eliminated gradually and will be reimpressed on the photoelectric cell in the same gradual manner. This tapered elimination and impression of the light beam does not produce a deleterious audible frequency in the reproduced circuit. It is realized, of course, that the shutter may be tripped by film notches, holes, clips or even by manual operation. It is also to be noted that although the shutter is tripped by a splice when the splice is at the upper point on roller 11, the action is timed so that the shutter has revolved substantially 90° when the splice has reached the translation point.

Thus, the above-mentioned mechanism has several advantages over the operation of self-powered devices or electrically controlled devices such as shown in Patent No. 1,810,527 mentioned above. Some of these features are a positive control of shutter operation from an independent constant uniform power source. This produces substantially instantaneous shutter operation which is uniform for each splice and which requires a minimum amount of energy. The flexible drive arrangement permits faster shutter operation at lower gear speeds, since when the energy stored in spring 24 by the friction load between the contact pads is released, the shutter is operated with a "snap" to its next stationary position. The small amount of energy required to trip the shutter reduces the interference of the device with the film passing over the roller and past the translation point, it being realized, of course, that this mechanism is operating in a sound reproducer where changes in speed of the film produce distortion in the reproduced sound.

I claim as my invention:

1. In a sound reproducing device the combination of a light source, means for projecting light from said source upon a film, a shutter normally without said light beam and adapted to be passed therethrough, a prime mover, a plurality of gears interconnecting said shutter with said prime mover and adapted to rotate said shutter through said light beam, means for operating a portion of said gears continuously without rotating said shutter, and means for tripping the remainder of said gears for rotating said shutter.

2. In a sound reproducing device the combination of means for projecting a light beam to the sound track portion of a motion picture film, a shutter, rotation of said shutter eliminating and re-impressing said beam upon said film, a prime mover, means interconnecting said prime mover with said shutter for exerting a rotating force on said shutter, and means for periodically releasing said shutter for a predetermined amount of rotation.

3. A sound reproducing device in accordance with claim 2 in which said periodical releasing means includes a lever under control of variations in said film.

4. A sound reproducing device in accordance with claim 2 in which said interconnecting means includes contacting friction pads, one of which is continuously rotated by said prime mover.

5. A sound reproducing device in accordance with claim 2 in which said interconnecting means includes a resilient member under tension, the released energy thereof being adapted to aid in rotating said shutter.

6. A sound reproducing device in accordance with claim 2 in which said shutter has a shape which tapers the elimination and re-impressing of said light beam to said film during 180° rotation thereof.

7. In a sound reproducing device the combination of means for projecting a light beam to the sound track portion of a motion picture film, a shutter adapted to be passed through said beam for eliminating and re-impressing said beam upon said film, a continuously rotatable shaft, a gear rotated by said shaft, a second gear in frictional contact with said first gear, said second gear being connected to said shutter, means for maintaining said shutter stationary, and means for operating said last-mentioned means upon variations in said film passing through said light beam.

8. In a sound reproducing device the combination of means for projecting a light beam to the sound track portion of a motion picture film, a shutter adapted to be passed through said light beam for eliminating and re-impressing said beam upon said film, a plurality of gears connected to said shutter, a second plurality of gears connected to the said first plurality of gears by frictional contact, means for continuously rotating said second plurality of gears, a spring adapted to drive said second plurality of gears, and means for tripping said shutter to permit 180° rotation thereof, said shutter being driven through the frictional contact between said two plurality of gears.

9. Sound film apparatus comprising means for advancing a motion picture film having splices therein, a constant source of light, means for transmitting a beam of light from said source to said film, a movable shutter having a diagonal light-cutting edge arranged to progressively intercept said beam of light as transmitted to said film, and means actuated by said splices passing a predetermined point on said apparatus for controlling the movement of the cutting edge of said shutter through said light beam.

10. Sound film apparatus comprising means for projecting a light beam to the sound track portion of a normal spliced motion picture film, a movable shutter adapted to progressively intercept said light beam as projected toward said film, and means actuated solely by said film splices for controlling the beginning of movement of said shutter for intercepting said light beam.

11. Sound film apparatus in accordance with claim 10, in which said shutter has a shape which tapers said light beam as impressed on said film.

12. In normal sound film apparatus for advancing sound film having splices therein, the combination of means for producing a light beam, means for projecting said beam to the sound track area of a film, a shutter for varying the impression of said beam on said sound track area in a predetermined manner, and means for controlling the beginning of movement of said shutter, said last-mentioned means being actuated solely by said film splices passing a predetermined point on said apparatus.

13. In sound motion picture film apparatus adapted to advance normal film having splices therein, a device for varying a light beam in a predetermined manner, said device including a constant source of light, means for transmitting a line of light from said source to said film, a movable shutter having a diagonal light-cutting edge arranged to progressively intercept light from said line of light as transmitted to said film, and means actuated by said splices as they pass a predetermined point on said apparatus for controlling the beginning of movement of said shutter.

14. Sound film apparatus for controlling the light impressing of a normal spliced motion picture film at predetermined intervals, said intervals being determined by the passage of film splices past a translation point comprising means for advancing said film, a source of light rays, means for defining said light rays into a beam of definite dimensions, means for projecting said light rays on said film, and means actuated solely by said splices for controlling the beginning of the change in position of said shuttering means, said shuttering means varying the intensity of said beam reaching said film during passage of said splices past said translation point.

15. For use in sound motion picture apparatus having a pair of rollers adapted to pass a film therebetween, with the axis of one of said rollers being movable with respect to the axis of the other roller, a device for varying the light density over splices in the sound track on said film, said device including on said casing, a light tube on said casing, having a light slit transversely of said sound track, a constant source of light, a shutter having a diagonal light-cutting edge arranged to cover and uncover said light slit upon movement of said shutter, and a system of levers mounted upon said apparatus arranged to transmit a multiplied movement of said movable roller caused by the passing of said splices between said rollers to release said shutter.

16. In sound motion picture apparatus, a pair of rollers arranged to feed a film therebetween, one of said rollers being mounted upon a fixed axis and the other roller being mounted upon a yieldably movable axis, a constant source of light, a light slit arranged transversely to a sound track on said film adapted to pass light from said source to said track, a shutter arranged to pass over said slit, said shutter having a diagonal light-cutting edge adapted to cover and uncover said light slit upon movement of said shutter, and a system of levers arranged to hold and release said shutter upon movement of said yieldably movable roller caused by a film splice passing between said rollers.

17. In sound motion picture apparatus the combination of a pair of rollers arranged to feed a film therebetween, said film having splices therein, means for resiliently pressing one of said rollers against the other, and means for automatically varying the light density on the sound track of said film over the splices therein, said means including a light slit arranged transversely to said sound track, a constant source of light adapted to transmit light through said slit to said sound track, a shutter having a diagonal light-cutting edge adapted to be moved transversely of said light slit, and mechanical means for translating the movement of said resiliently pressed roller caused by a splice passing between said rollers for releasing said shutter.

18. For use in sound motion picture apparatus adapted to advance a film having splices therein, a device for varying the light densities over splices in sound tracks on said film, said device including a constant source of light, means for transmitting a line of light from said source to said film transversely of said sound track, a movable shutter having a diagonal light-cutting edge arranged to progressively intercept light from said line of light, and means actuated by the passing of said splices past a predetermined point on said apparatus for controlling said shutter.

19. In a film apparatus for advancing spliced motion picture film, the combination of means for projecting a light beam to the sound track portion of said film, a shutter adapted to be resiliently urged into a position to intercept said beam, and a splice controlled releasing means for said shutter, said shutter being normally out of the path of said beam.

20. A film apparatus in accordance with claim 19 in which power means are provided for maintaining said resilient means continuously energized.

WILLIAM A. BLACK.